United States Patent

Hayakawa et al.

[11] Patent Number: 5,882,557
[45] Date of Patent: Mar. 16, 1999

[54] METHOD OF FABRICATING ULTRASONIC COUPLER

[75] Inventors: Kenichi Hayakawa; Kazuhiro Watanabe; Kiyoto Matsui; Shiro Takeda, all of Kawasaki, Japan

[73] Assignee: Fujitsu Limited, Kawasaki, Japan

[21] Appl. No.: 675,841

[22] Filed: Jul. 5, 1996

Related U.S. Application Data

[63] Continuation of Ser. No. 525,320, Sep. 7, 1995, abandoned, which is a continuation of Ser. No. 155,149, Nov. 22, 1993, abandoned.

[30] Foreign Application Priority Data

Dec. 15, 1992 [JP] Japan .................................... 4-334752

[51] Int. Cl.$^6$ ............................ B29C 35/16; B29C 39/10
[52] U.S. Cl. ........................... 264/28; 264/273; 264/274; 264/278; 264/279; 264/313; 264/337
[58] Field of Search ............................ 264/28, 313, 279, 264/219, 273, 274, 278, 337

[56] References Cited

U.S. PATENT DOCUMENTS

| | | | |
|---|---|---|---|
| 4,160,074 | 7/1979 | Komada et al. | 264/40.4 X |
| 4,206,899 | 6/1980 | Whitehead | 264/28 X |
| 4,315,037 | 2/1982 | Kelly . | |
| 4,774,957 | 10/1988 | Nambu et al. | 264/28 X |
| 4,802,839 | 2/1989 | Hidawa | 264/313 X |
| 4,808,353 | 2/1989 | Nambu et al. | 264/28 |
| 4,854,843 | 8/1989 | Takeda et al. | 264/313 X |
| 4,916,170 | 4/1990 | Nambu et al. | 264/28 X |
| 4,971,737 | 11/1990 | Infanti . | |
| 5,071,602 | 12/1991 | Nambu et al. | 264/28 |
| 5,078,149 | 1/1992 | Katsumata et al. . | |
| 5,318,035 | 6/1994 | Konno et al. . | |

FOREIGN PATENT DOCUMENTS

| | | | |
|---|---|---|---|
| 3922641 A1 | 1/1991 | Germany . | |
| 47-12854 | 4/1972 | Japan | 264/28 |
| 5-42800 | 2/1993 | Japan | 264/28 |

*Primary Examiner*—Karen Aftergut
*Attorney, Agent, or Firm*—Staas & Halsey

[57] ABSTRACT

A method of fabricating an ultrasonic coupler to a specified configuration such that the ultrasonic coupler is fabricated by freezing and defrosting an aqueous solution containing a polymer. A surface of the fabricated ultrasonic coupler is made to be smooth. The ultrasonic coupler is fabricated using an ultrasonic coupler fabricating die including members each made of silicone rubber which varies in compliance with the expansion and the contraction of the aqueous solution. To fabricate the ultrasonic coupler, the aqueous solution containing a polyvinyl alcohol (PVA) is poured into the die. Then, the die is subjected to the process of cooling to below the freezing point and the process of recovery to room temperature so as to progress a bridging of the PVA, thereby progressing a gelling of the aqueous solution.

16 Claims, 8 Drawing Sheets

METHOD OF FABRICATING ULTRASONIC COUPLER

This application is a continuation of application Ser. No. 08/525,320, filed Sep. 7, 1995, now abandoned, which is a continuation of application Ser. No. 08/155,149, filed Nov. 22, 1993, also now abandoned.

BACKGROUND OF THE INVENTION

1. Field of the Invention

The present invention relates to a method of fabricating an ultrasonic coupler which is interposed between an ultrasonic probe and an object to be observed with the use of an ultrasonic diagnostic system.

2. Description of the Related Art

There has been generally used an ultrasonic diagnostic system for displaying a tomographic image of the human body utilizing ultrasounds. Now, referring to the drawings, there will be explained a case where such an ultrasonic diagnostic system is used to observe diagnostic portions of the human body, for example, a thyroid gland, a carotid artery, and a mammary gland, which all exist near the body surface.

Figure 7:
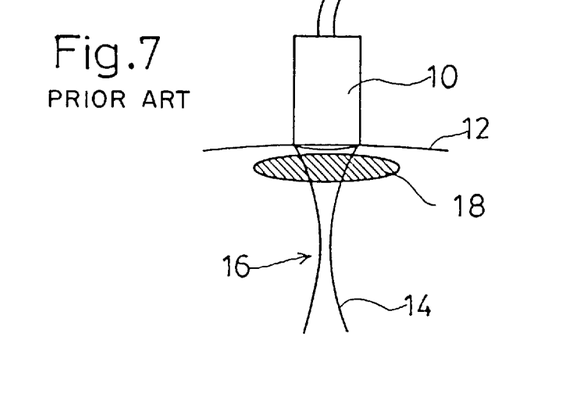
FIG. 7 is a view schematically showing a state in which an ultrasonic probe directly contacts with the body surface.
Figure 8:
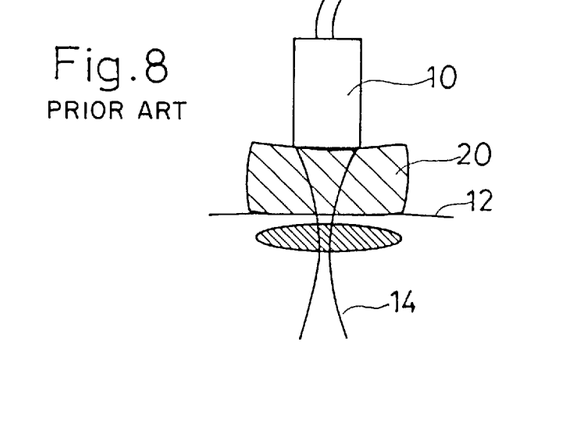
FIG. 8 is a view schematically showing a state wherein an ultrasonic coupler is placed between an ultrasonic probe and the body surface.

FIG. 7 is a view schematically showing a state in which an ultrasonic probe for transmission and reception of ultrasounds directly contacts with the body surface. FIG. 8 is a view schematically showing a state wherein an ultrasonic coupler, which is sufficiently conductive in ultrasound, is placed between an ultrasonic probe and the body surface.

As shown in FIG. 7, in a case where an ultrasonic probe 10 directly contacts the body surface 12, a convergent point of an ultrasonic beam 14 is given by a position 16 which is placed at a distance from the body surface 12. Consequently, when a diagnostic portion 18, which exists near the body surface 12, is observed, a resolving power will degrade. Thus, in such a case, in order to contribute to an enhancement of the resolving power, it is so designed, as shown in FIG. 8, that an ultrasonic coupler 20 is placed between the ultrasonic probe 10 and the body surface 12, so that the ultrasonic beam 14 can be converged on the neighborhood of the diagnostic portion 18.

Such an ultrasonic coupler is made of a non-hydrous gel substance consisting of a urethane rubber, a silicone rubber or the like, and alternatively, a polymer hydrous gel substance such as a polyvinyl alcohol (PVA), a polyvinyl pyrrolidone (PVP), a polyethylene oxide (PEO) and the like.

In case of the use of the non-hydrous gel substance for the ultrasonic coupler, the ultrasounds transmitted from an ultrasonic probe will be attenuated during passing through the ultrasonic coupler made of the non-hydrous gel substance, since the attenuation of the ultrasounds is generally large (approximately, 2 dB/cm/MHz) within the non-hydrous gel substance. Consequently, the ultrasounds hardly enter the object to be monitored. Similarly, the ultrasounds reflected by the inner observed object will be also attenuated during passing through the ultrasonic coupler. Thus, it will be a cause of deterioration of the ultrasound signal to noise ratio (S/N).

Figure 9:
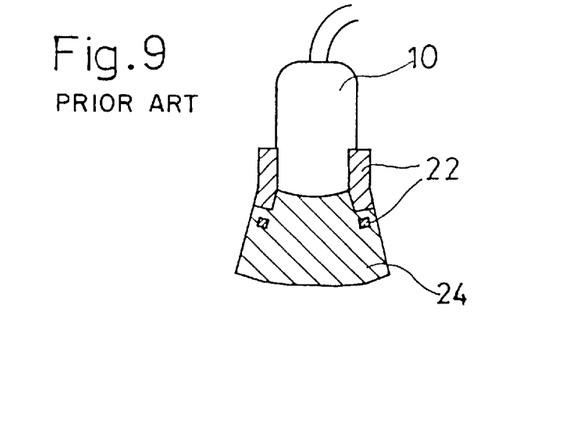
FIG. 9 is a view schematically showing an ultrasonic coupler on which connection members for connecting the coupler with the ultrasonic probe are fixed.

On the other hand, in case of the use of the ultrasonic coupler made of the polymer hydrous gel substance, it is possible to implement a high S/N, since the attenuation of the ultrasounds is extremely small (approximately, 0.1 db/cm/MHz) within the polymer hydrous gel substance. However, if such an ultrasonic coupler is left in an atmosphere, water evaporates and it will spoil the function of the ultrasonic coupler. Therefore, it is necessary to preserve the ultrasonic coupler in a sealed vessel when it is not used. Further, such an ultrasonic coupler easily slips and it is difficult to hold by hand. In view of the foregoing, there is used an ultrasonic coupler 24, as shown in FIG. 9, on which connection members 22 for connecting the coupler with the ultrasonic probe 10 are fixed. An aqueous solution containing a PVA among the polymer hydrous gel substance has such a characteristic that when the aqueous solution is frozen below the freezing point and defrosted at the room temperature, a bridging between molecules progresses thereby, gelling. A repetition of freezing and defrosting advances an additional bridging (refer to Japanese Patent Publication No. Sho. 47-12854). The gelling substance (PVA gel) has an excellent mechanical characteristic in points of a high tearing strength, and a full elasticity. Thus, the gelling substance is suitable for the ultrasonic coupler.

Next, referring to the drawings, there will be explained a method of fabricating an ultrasonic coupler, which is made of an aqueous solution containing the PVA, among methods of fabricating an ultrasonic coupler.

FIGS. 10A–10F are sectional views showing steps of fabricating an ultrasonic coupler.

Figure 10A:
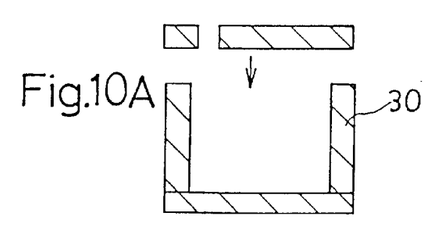
Figure 10B:
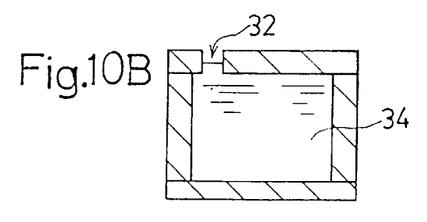
Figure 10C:
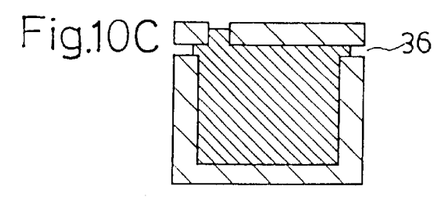
Figure 10D:
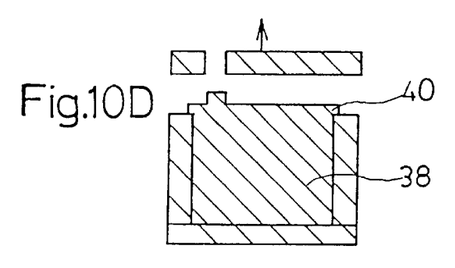
Figure 10E:
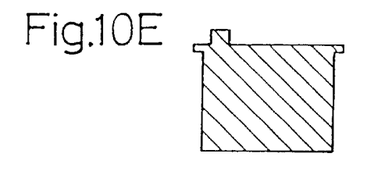
Figure 10F:
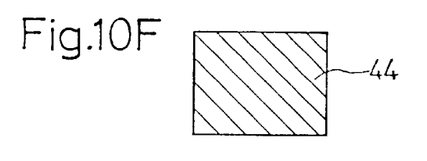

First, as shown in FIG. 10A, a specified configuration of die 30 is prepared. Next, as shown in FIG. 10B, an aqueous solution 34 containing the PVA is poured from an inlet 32 of the die 30 into the die 30. After pouring the aqueous solution 34, it is frozen below the freezing point. The aqueous solution 34 will increase in volume about 10% when frozen. Consequently, as shown in FIG. 10C, for example, it will happen that a parting segment 36 of the die 30 is destroyed, or expanded portions are formed. As a result, as shown in FIG. 10D, a gel 38 having a projection 40 is made up. The steps of FIGS. 10C and 10D are repeatedly performed. Thereafter, as shown in FIG. 10E, the gel 38 is separated from the die. Finally, as shown in FIG. 10F, the expanded portion or the projection 40 is excised so as to reshape into a specified configuration of ultrasonic coupler 44.

As described above, since the aqueous solution containing the PVA will increase in volume about 10% when frozen, according to the above described fabrication method, there will be formed the projections due to gelling. Thus, it is necessary to excise or remove the projections and it will be troublesome. Further, a surface, which is formed by removal of projections, will be poor in smoothness. If such a surface is in contact with a body surface or an ultrasonic probe, it will be a cause of a large attenuation of the ultrasounds.

SUMMARY OF THE INVENTION

In view of the foregoing, it is therefore an object of the present invention to provide a method of fabricating an ultrasonic coupler in a specified configuration in steps less than that of the above-described method, when the ultrasonic coupler is fabricated by means of freezing and defrosting the aqueous solution containing a polymer such as the PVA, and in addition, capable of providing a favorable smoothness of a surface of the fabricated ultrasonic coupler.

A method of fabricating an ultrasonic coupler according to the present invention basically comprises the steps of:
preparing a die for fabrication of the ultrasonic coupler at least a part of which is provided with a rubber-like elastic body with expanding and contracting properties;
pouring an aqueous solution containing a polymer into said die for fabrication of the ultrasonic coupler; and
fabricating the ultrasonic coupler by means of freezing and defrosting the poured aqueous solution.

In the method of fabricating an ultrasonic coupler as described above, at least a part of the rubber-like elastic body has a thickness of 2 mm or less.

Further, the term "rubber-like" means having a Young's modulus E of $1.5 \times 10^{-4}$ [Pa]-$5.0 \times 10^{-4}$ [Pa].

Further, in the method of fabricating an ultrasonic coupler as described above, the die for fabrication of the ultrasonic coupler may comprise a first die having a T-shaped like segment for forming a junction plane of the ultrasonic coupler and an ultrasonic probe to be contacted by the ultrasonic coupler as a part of the configuration of the ultrasonic coupler, and a second die, used in conjunction with said first die, for forming the configuration of the ultrasonic coupler of all the parts except said junction plane. The first die is adapted to detachably mount a connection member for connecting the ultrasonic coupler with the ultrasonic probe.

Furthermore, in a method of fabricating an ultrasonic coupler as described above, the first die is a top die formed in such a configuration that the T-shaped like segment faces downwards and an inlet for pouring the aqueous solution is formed upwards more than the T-shaped like segment, and the second die is a bottom die having a bottom wall consisting of a rubber-like elastic body with a thickness of 2 mm or less.

Still furthermore, in the method of fabricating an ultrasonic coupler as described above, the rubber-like elastic body is a silicone rubber, and a coefficient of extension of the rubber-like elastic body is 40% or more.

Still furthermore, in the method of fabricating an ultrasonic coupler as described above, the polymer is a polyvinyl alcohol.

At least a part of a die for fabrication of the ultrasonic coupler, which is used in a method of fabricating an ultrasonic coupler according to the present invention, is composed of a rubber-like elastic body. The rubber-like elastic body expands and contracts in accordance with the expansion and the contraction of the aqueous solution which result from the freezing and defrosting of the aqueous solution poured from an inlet. These properties make it possible to prevent the die from being destroyed, and in addition, to prevent the expanded portions or projections due to gelling from being formed. Thus, there is no need to remove any expanded portions. Further, since the rubber-like elastic body follows the expansion and the contraction of the aqueous solution, the ultrasonic coupler has no surface which is poor in smoothness, while according to the prior art, a surface exposed by removal of the expanded portions is poor in smoothness.

In a case where at least a part of the rubber-like elastic body of the die for fabrication of the ultrasonic coupler, as discussed above has a thickness of 2 mm or less, according to the present invention, it may be expected that the rubber-like elastic body follows more favorably a variation in volume involved in freezing and defrosting of the aqueous solution. As a result, an ultrasonic coupler which is more satisfactory in smoothness of the surface is obtained. Further, in a case where the die for fabrication of the ultrasonic coupler as mentioned above is segmented into a first die and a second die, and a connecting member for connecting an ultrasonic probe to the ultrasonic coupler is mounted on the first die, it is possible to fabricate the ultrasonic coupler provided with the connecting member.

Furthermore, in a case where the first die is a top die formed in such a configuration that the T-shaped like segment faces downwards and an inlet for pouring the aqueous solution is formed upwards more than the T-shaped like segment, and the second die is a bottom die having a bottom wall consisting of a rubber-like elastic body having a thickness of 2 mm or less, there is no portion (a pouring gate) to be excised on the respective contact surfaces of the fabricated ultrasonic coupler with the ultrasonic probe and of the same coupler with the body surface. This may contribute to the smoothness of the ultrasonic coupler. Thus, it is possible to reduce an attenuation of the ultrasounds propagating therebetween.

The rubber-like elastic body is preferably made of a silicone rubber, since it is chemically stable and excellent in both thermal resistance (300° C.) and cold resistance (−70° C. ~−120° C.), and in addition it has no bad smell. Incidentally, it has been proven by experiment that a coefficient of extension of the rubber-like elastic body is desirably 40% or more.

In the method of fabricating the ultrasonic coupler according to the present invention, the aqueous solution containing the PVA is used, and it is possible to obtain the ultrasonic coupler which has enough flexibility to fit an unevenness of the human body and a high tearing strength, and in addition through which an attenuation of the ultrasounds is extremely small.

BRIEF DESCRIPTION OF THE DRAWINGS

FIGS. 10A–10F are the views useful for understanding steps of fabricating an ultrasonic coupler, and each of FIGS.

10A–10D is a sectional view showing the die for fabrication of the ultrasonic coupler.

DESCRIPTION OF THE PREFERRED EMBODIMENTS

Hereinafter, there will be described embodiments of the present invention.

FIGS. 1A–1F are the views useful for understanding a method of fabricating an ultrasonic coupler according to the first embodiment of the present invention, and each of FIGS. 1A–1D is a sectional view showing a die for fabrication of the ultrasonic coupler.

Figure 1A:
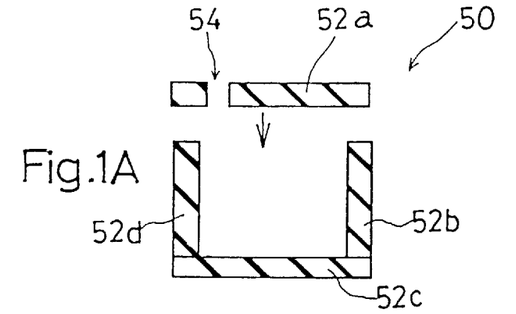
FIGS. 1A–1F are the views useful for understanding a method of fabricating an ultrasonic coupler according to the first embodiment of the present invention, and FIGS. 1A–1D each are a sectional view showing a die for fabrication of the ultrasonic coupler.
Figure 1B:
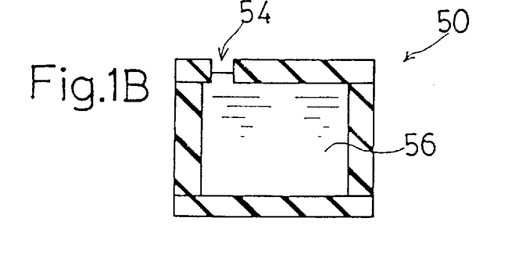
Figure 1C:
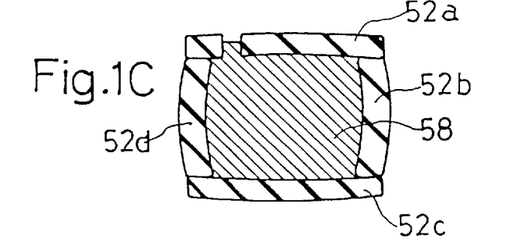
Figure 1D:
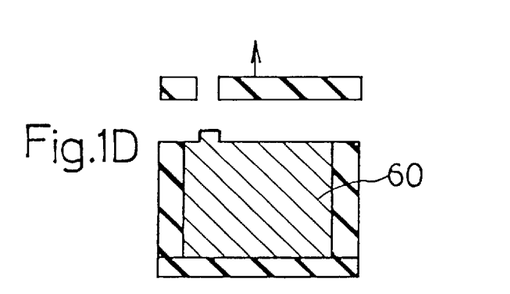
Figure 1E:
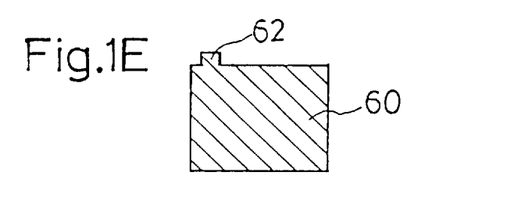
Figure 1F:
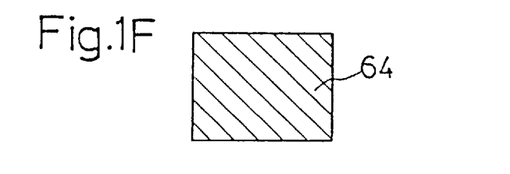

As shown in FIG. 1A, a die 50 for fabrication of the ultrasonic coupler comprises members 52a, 52b, 52c and 52d, each consisting of silicone rubber. A pouring inlet 54 for pouring an aqueous solution containing a PVA is formed in the member 52a. To fabricate the ultrasonic coupler, first, as shown in FIG. 1B, an aqueous solution 56 containing a PVA system of polymer is poured from the pouring inlet 54 into the die 50. The die 50 filled with the aqueous solution is subjected to the step of cooling to below freezing point and the step of recovery to room temperature so as to progress a bridging of the PVA, thereby progressing a gelling. The aqueous solution 56 containing a PVA system of polymer increases in volume about 10% when frozen, and the volume is restored to the former at the room temperature. The expansion and contraction to the aqueous solution 56 is repeatedly performed. As mentioned above, the members 52a, 52b, 52c and 52d, which constitute in their combination the ultrasonic coupler fabricating die 50, each consists of silicone rubber. Thus, for example, as shown in FIG. 1C, the die 50 is expanded in compliance with the expansion of the aqueous solution 56 during freezing 58. Consequently, the die 50 is not destroyed, and more of the members 52a, 52b, 52c and 52d constituting the die 50 comes off, thereby preventing the formation of portions protruding from the die 50. The gel 60, which has been subjected to the step of cooling to below freezing point and the step of recovery to room temperature a predetermined number of times over, and finally defrosted at room temperature, as shown in FIG. 1D, is provided with the configuration patterned after the ultrasonic coupler fabricating die 50. After the member 52a is removed, as shown in FIG. 1E, the gel 60 is separated. The formed pouring gate portion 62 is excised, so that the gel is reshaped into a specified configuration of an ultrasonic coupler 64, as shown in FIG. 1F.

In a case where an ultrasonic coupler is fabricated using the ultrasonic coupler fabricating die according to the present embodiment as described above, the ultrasonic coupler fabricating die expands and contracts in compliance with the expansion and the contraction of the aqueous solution. These properties make it possible to prevent the die from being destroyed, and in addition, to prevent the expanded portions or projections due to gelling from being formed. Thus, there is no need for the expanded portions to be excised since none are formed. Further, according to the present embodiment, since no portion of the ultrasonic coupler protrudes, it is possible to expect smoothness of the ultrasonic coupler, while according to the prior art, a surface exposed by excision of the expanded gel portions is poor in smoothness.

Next, the second embodiment of the present invention will be described referring to FIGS. 2A–2F.

FIGS. 2A–2F are the views useful for understanding a method of fabricating an ultrasonic coupler according to the second embodiment of the present invention, and each of FIGS. 2A–2D is a sectional view showing a die for fabrication of the ultrasonic coupler.

Figure 2A:
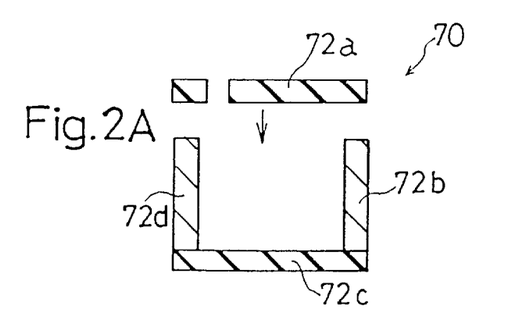
FIGS. 2A–2F are the views useful for understanding a method of fabricating an ultrasonic coupler according to the second embodiment of the present invention, and each of FIGS. 2A–2D is a sectional view showing a die for fabrication of the ultrasonic coupler.
Figure 2B:
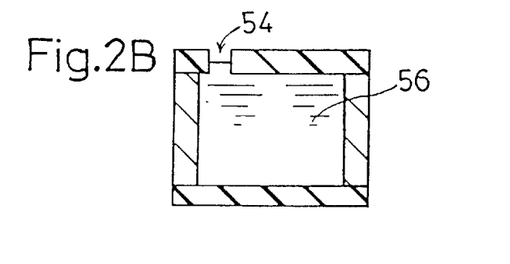
Figure 2C:
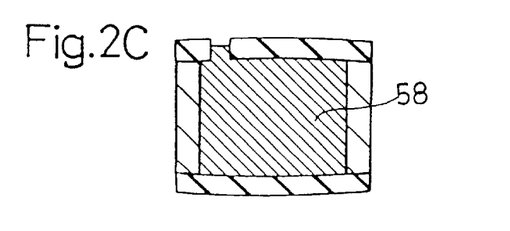
Figure 2D:
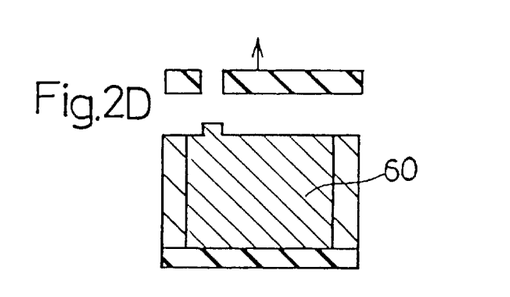

A die 70 for fabrication of the ultrasonic coupler is the same as the ultrasonic coupler fabricating die 50 shown in FIG. 1A in basic structure, except that among members 72a, 72b, 72c and 72d, only the member 72a constituting a lid and the member 72c constituting a bottom are made of silicone rubber, and the remaining members are made of metallic material. Gel portions 60a and 60c (FIG. 2E), which will come in contact with the member 72a and the member 72c, respectively, form contact surfaces with the body surface and an ultrasonic probe, respectively. Thus, it is necessary for these portions to be provided with smoothness. The production process of the ultrasonic coupler 64 with the use of this die is the same as that in the first embodiment.

Figure 2E:
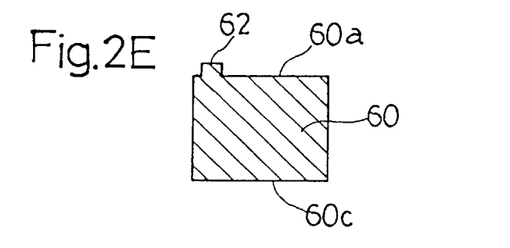
Figure 2F:
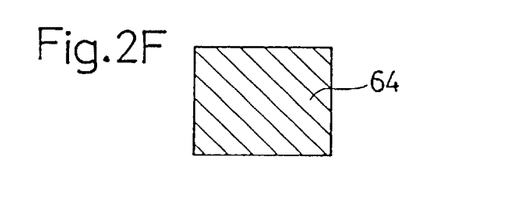

In the second embodiment, even if the silicone rubber is used only for the member 72a and the member 72c which will come in contact with the portions 60a and 60c requiring the smoothness, respectively, it is possible to expect the same effect as in the first embodiment.

Next, the third embodiment of the present invention will be described referring to FIGS. 3A–3F.

FIGS. 3A–3F are the views useful for understanding a method of fabricating an ultrasonic coupler according to the third embodiment of the present invention, and each of FIGS. 3A–3D is a sectional view showing a die for fabrication of the ultrasonic coupler.

Figure 3A:
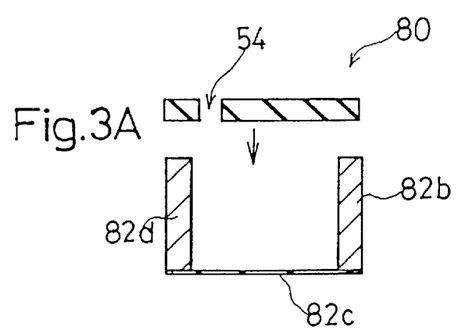
FIGS. 3A–3F are the views useful for understanding a method of fabricating an ultrasonic coupler according to the third embodiment of the present invention, and each of FIGS. 3A–3D is a sectional view showing a die for fabrication of the ultrasonic coupler.
Figure 3B:
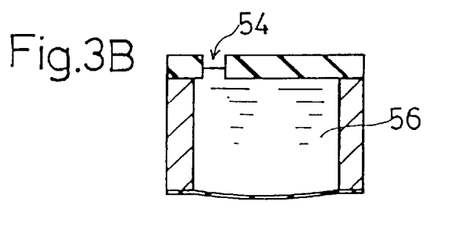
Figure 3C:
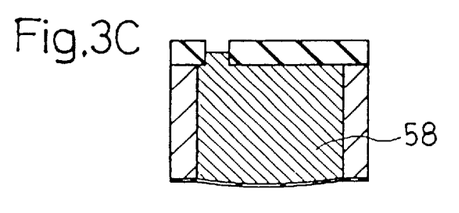
Figure 3D:
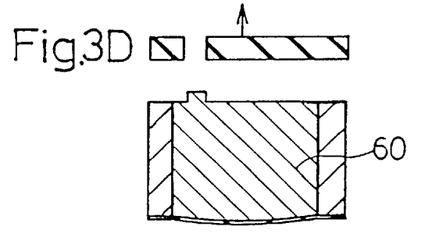
Figure 3E:
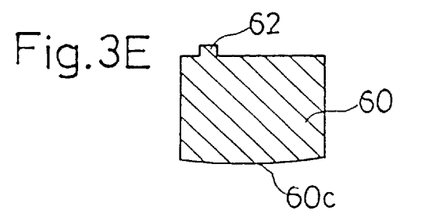
Figure 3F:
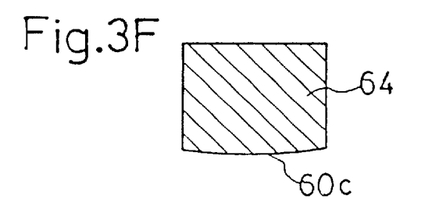

A die 80 for fabrication of the ultrasonic coupler is the same as the ultrasonic coupler fabricating die 50 shown in FIG. 1A in basic structure, except that only a member 82c is made of silicone rubber having a thickness 2 mm or less, and members 82b and 82d are made of metallic material. The production process of the ultrasonic coupler 64 with the use of this die is the same as that in the first embodiment and the second embodiment.

In the third embodiment, if the member 82c is made of silicone rubber having a thickness of 2 mm or less in the form of a film, it may be expected that the member 82c follows more favorably a variation in volume involved in the freezing and the defrosting of the aqueous solution 56, thereby obtaining the formed surface 60c (FIG. 3E) coming in contact with the member 82c, which is more satisfactory in smoothness.

Next, the fourth embodiment of the present invention will be described referring to FIGS. 4A–4E.

Figure 4A:
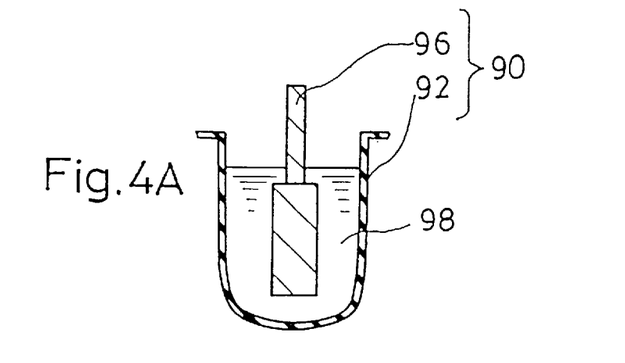
FIGS. 4A–4E are the views useful for understanding a method of fabricating an ultrasonic coupler according to the fourth embodiment of the present invention, and each of FIGS. 4A–4C is a sectional view showing a die for fabrication of the ultrasonic coupler.
Figures 4B, 4C, 4E:
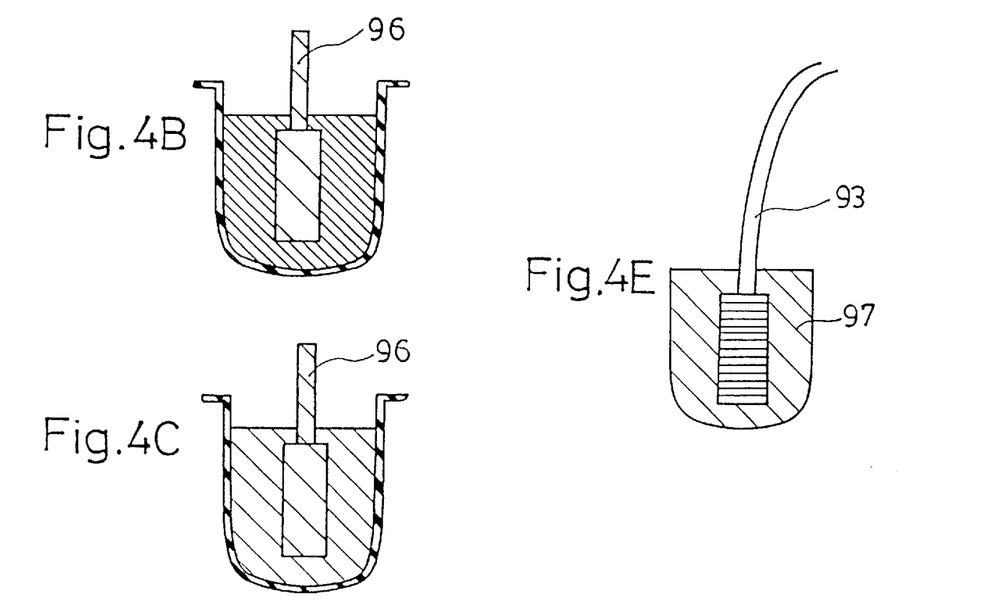
Figure 4D:
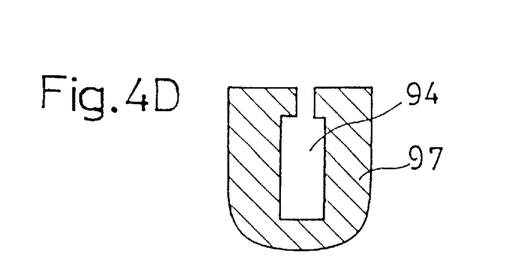

FIGS. 4A–4E are the views useful for understanding a method of fabricating an ultrasonic coupler according to the fourth embodiment of the present invention, and each of FIGS. 4A–4C is a sectional view showing a die for fabrication of the ultrasonic coupler.

A die 90 for fabrication of the ultrasonic coupler comprises a die 92 made of bag-like silicone rubber having a thickness 2 mm or less, and a die 96 for forming a hole 94 (FIG. 4D) adapted for inserting an ultrasonic probe 93. Since the ultrasonic coupler fabricating die 90 comprises the die 92 made of bag-like silicone rubber, the die is not destroyed owing to freezing and defrosting the aqueous solution 98 containing a PVA system of polymer. When the die 96 is removed, there is formed the hole 94 for connecting the ultrasonic probe 93 in production of an ultrasonic coupler 97.

Next, the fifth embodiment of the present invention will be described referring to FIGS. 5A–5F.

FIGS. 5A–5F are the views useful for understanding a method of fabricating an ultrasonic coupler according to the fifth embodiment of the present invention, and each of FIGS. 5A–5D is a sectional view showing a die for fabrication of the ultrasonic coupler.

Figure 5A:
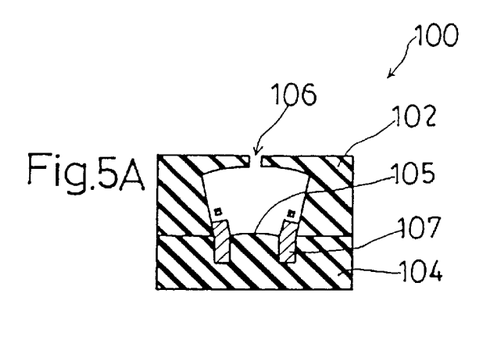
FIGS. 5A–5F are the views useful for understanding a method of fabricating an ultrasonic coupler according to the fifth embodiment of the present invention, and each of FIGS. 5A–5D is a sectional view showing a die for fabrication of the ultrasonic coupler.

A die 100 for fabrication of the ultrasonic coupler comprises a top die 102 and a bottom die 104 each made of silicone rubber. Thus, the top die 102 and the bottom die 104 are flexible. The top die 102 is provided with an inlet 106 for pouring the aqueous solution containing a PVA system of polymer. In the middle of the bottom die 104, there is formed a T-shaped like segment 105 forming a junction plane between an ultrasonic probe (not illustrated) and the ultrasonic coupler. On the T-shaped like segment 105, there is mounted a connecting member 107 for connecting the ultrasonic probe to the ultrasonic coupler.

Figure 5B:
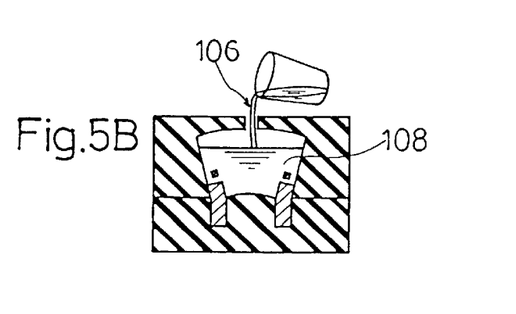
Figure 5C:
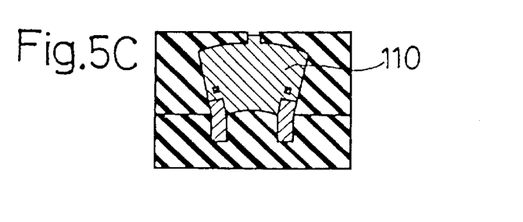
Figure 5D:
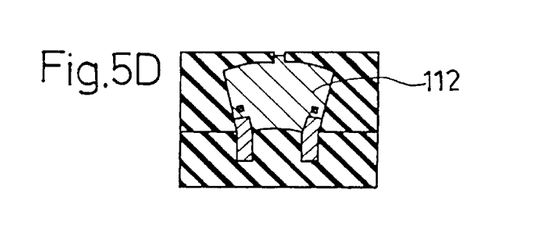
Figure 5E:
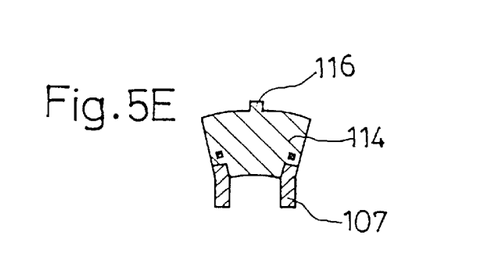
Figure 5F:
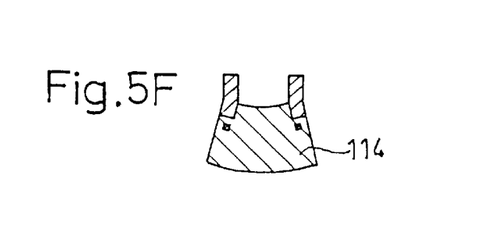

To fabricate the ultrasonic coupler, first, as shown in FIG. 5B, an aqueous solution 108 containing a PVA system of polymer is poured from the pouring inlet 106 into the die 100. The die 100 filled with the aqueous solution 108 is subjected to the process of cooling to below freezing point and the process of recovery to room temperature a plurality of times over so as to progress a bridging of the PVA, thereby progressing a gelling. The aqueous solution 108 containing a PVA system of polymer increases in volume about 10% when frozen, and the volume is restored to the former at room temperature. Thus, the expansion and contraction of the aqueous solution 108 is repeatedly performed. As mentioned above, the top die 102 and the bottom die 104, which constitute in their combination the ultrasonic coupler fabricating die 100, each consists of silicone rubber. Thus, the die 100 is expanded in compliance with the expansion of the frozen aqueous solution 110 below freezing point. Consequently, the die 100 is not destroyed, and the top die 102 and the bottom die 104 constituting the die 100 do not come off, so that portions protruded from the die 100 are not formed. The gel 112, which has been subjected to the process of cooling to below freezing point and the process of recovery to room temperature a predetermined number of times over, and finally defrosted at room temperature, as shown in FIG. 5D, is provided with the configuration patterned after the ultrasonic coupler fabricating die 100. As shown in FIG. 5E, the gel is separated in the form of the ultrasonic coupler 114. The pouring gate portion 116 formed on the ultrasonic coupler 114 is excised, so that the gel is reshaped into a specified configuration of ultrasonic coupler 114 on which the connecting member 107 is mounted, as shown in FIG. 5F.

According to the method of fabricating the ultrasonic coupler using the ultrasonic coupler fabricating die as mentioned above, it is possible to fabricate the ultrasonic coupler provided with the connecting member for connecting the ultrasonic probe thereto. Further, since the bottom die is provided with the T-shaped like segment patterned after the configuration of the junction plane of the ultrasonic coupler with the ultrasonic probe, the formed junction plane is excellent in smoothness.

Next, the sixth embodiment of the present invention will be described referring to FIGS. 6A–6E.

FIGS. 6A–6E are the views useful for understanding a method of fabricating an ultrasonic coupler according to the sixth embodiment of the present invention, and each of FIGS. 6A–6D is a sectional view showing a die for fabrication of the ultrasonic coupler.

Figures 6A, 6D:
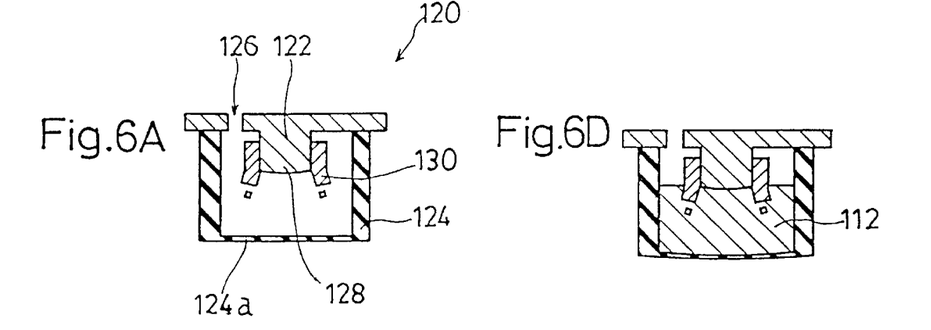
FIGS. 6A–6E are the views useful for understanding a method of fabricating an ultrasonic coupler according to the sixth embodiment of the present invention, and each of FIGS. 6A–6D is a sectional view showing a die for fabrication of the ultrasonic coupler.

A die 120 for fabrication of the ultrasonic coupler comprises a top die 122 made of metal and a bottom die 124 made of silicone rubber. Thus, the bottom die 124 is flexible. The top die 122 is provided with an inlet 126 for pouring the aqueous solution containing a PVA. In the middle of the top die 122, there is formed a T-shaped like segment 128, a surface 128a of which forms a junction plane between an ultrasonic probe (not illustrated) and the ultrasonic coupler. The T-shaped like segment 128 is formed in such a configuration that the surface 128a faces downwards. On the T-shaped like segment 128, there is mounted a connecting member 130 for connecting the ultrasonic probe to the ultrasonic coupler. The bottom die 124 has a bottom wall 124a having a thickness of 2 mm or less. The bottom wall 124a has a thickness less than and a flexibility greater than that of any other portion of the bottom die 124 and that of the top die 122. Thus, it may be expected that the bottom die 124 follows more favorably a variation in volume involved in the freezing and the defrosting of the aqueous solution.

Figure 6B:
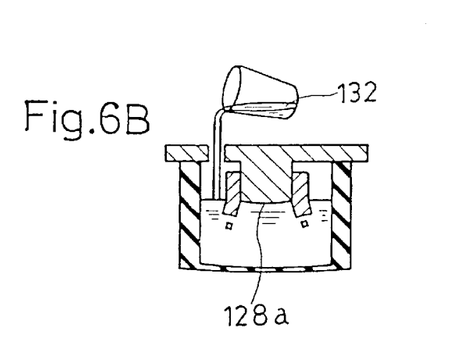
Figure 6C:
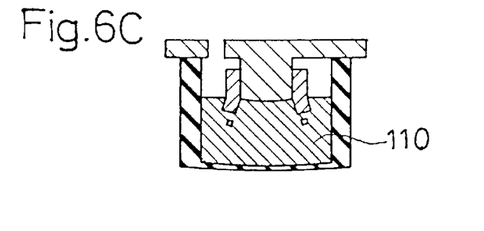

To fabricate the ultrasonic coupler, first, as shown in FIG. 6B, an aqueous solution 132 containing a PVA system of polymer is poured from the pouring inlet 126 into the die 120. It is sufficient for the aqueous solution 132 to be poured until the junction plane 128a is covered, and it is unnecessary to pour the aqueous solution 132 until the die 120 fills with the aqueous solution 132 overall. After the aqueous solution 132 is poured into the die 120, the die 120 is subjected to the process of cooling to below freezing point and the process of recovery to room temperature a plurality of times over. These processes, until the aqueous solution is defrosted at room temperature, as shown in FIG. 6D, are the same as those in the fifth embodiment shown in FIGS. 5A–5E. Hence, in FIGS. 6A–6D, the same parts are denoted by the same reference numbers as those of FIGS. 5A–5D, and the associated explanation is omitted.

Figure 6E:
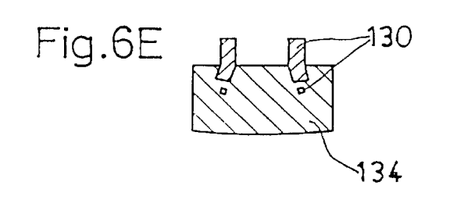

A connecting member 130 is mounted on the ultrasonic coupler 134 after separation from the die 120, as shown in FIG. 6E. A specified configuration of the ultrasonic coupler 134, on which the connecting member for connecting the ultrasonic probe is mounted, is produced without the necessity for an excision process of a pouring gate portion.

According to the method of fabricating the ultrasonic coupler using the ultrasonic coupler fabricating die as mentioned above, it is possible to fabricate the ultrasonic coupler provided with the connecting member for connecting the ultrasonic probe thereto. Further, since the top die is provided with the T-shaped like segment patterned after the configuration of the junction plane of the ultrasonic coupler with the ultrasonic probe, the formed junction plane is excellent in smoothness. Further, in a case where the die does not fill with the aqueous solution, there will be formed no pouring gate portion. Even if the pouring gate portion is formed, there is no necessity for an excision process for a pouring gate portion. Thus, it is possible to decrease the production cost. Further, the bottom die is provided with a bottom wall having a thickness of 2 mm or less. Thus, it may be expected that the bottom die follows more favorably a variation in volume involved in the freezing and the defrosting of the aqueous solution. Therefore, when the plane associated with the bottom die is given as a contact plane with the body surface, an attenuation of the ultrasounds may be further reduced.

Incidentally, according to the respective embodiments of the present invention as described above, a silicone rubber is used as a rubber-like elastic body. But, it should be noted that the rubber-like elastic body is not limited to the silicone rubber. Any one is acceptable, as the rubber-like elastic body, which is chemically stable and has a Young's modulus E of $(1.5/5.0) \times 10^{-4}$ [Pa], and excellent in both thermal resistance and cold resistance, and in addition which may follow the expansion and the contraction of the aqueous solution.

The ultrasonic couplers, which are fabricated in accordance with the respective embodiments as described above, are desirably preserved in a sealed case or vessel, when they are not used, for the purpose of preventing an evaporation of water.

When the aqueous resolution containing a PVA used in the respective embodiments as described above is subjected to the expansion and the contraction, it becomes a gel which has enough flexibility (hardness: $2.0 \times 10^4$ dyne/cm$^2$) to fit an unevenness of the human body and a high tearing strength (hardness: $2.0 \times 10^6$ dyne/cm$^2$). In addition, according to the obtained gel, an attenuation of the ultrasounds through the gel is extremely small (attenuation coefficient: 0.1 dB/cm/MHz), and it is excellent in acoustic matching to the human body (acoustic impedance: $1.52 \times 10^6$ kg/m$^2$/s). Thus, if such a gel is used as an ultrasonic propagation material, it will be possible to obtain an excellent ultrasonic coupler.

The present invention is not limited to the particular embodiments described above. Various changes and modifications may be made within the spirit and scope of the invention.

We claim:

1. A method of fabricating an ultrasonic coupler, comprising the steps of:
    preparing a die, wherein at least part of the die is provided with an elastic body with expanding and contracting properties, said step of preparing a die including
        forming a first die for forming a junction plane of the ultrasonic coupler and an ultrasonic probe to be contacted by the ultrasonic coupler as a part of a configuration of the ultrasonic coupler, the first die being adapted to detachably mount a connection member for connecting the ultrasonic coupler with the ultrasonic probe, and thereby allowing a simultaneous connection of the ultrasonic coupler to the connection member during formation of the ultrasonic coupler, and
        forming a second die, used in conjunction with the first die, for forming the configuration of the ultrasonic coupler except for the junction plane;
    pouring an aqueous solution containing a polymer into the prepared die; and
    freezing and defrosting the poured aqueous solution to form the ultrasonic coupler having the connection member connected thereto.

2. The method of fabricating an ultrasonic coupler according to claim 1, further comprising;
    facing the first die downwards, such that the first die is a top die, and
    forming an inlet in the first die for pouring the aqueous solution into the die; and
    said step of forming a second die further comprising;
        forming a bottom wall comprising an elastic body having a thickness of no greater than 2 mm for the second die, the second die being a bottom die.

3. The method of fabricating an ultrasonic coupler according to claim 1, wherein the elastic body is a silicone rubber.

4. The method of fabricating an ultrasonic coupler according to claim 1, wherein the polymer is a polyvinyl alcohol.

5. The method of fabricating an ultrasonic coupler according to claim 1, wherein a coefficient of extension of the elastic body is at least 40%.

6. The method of fabricating an ultrasonic coupler according to claim 1, wherein said step of fabricating a second die comprises forming a bottom wall of the second die having a degree of flexibility greater than all other portions of the first and second dies.

7. The method of fabricating an ultrasonic coupler according to claim 1, wherein said step of fabricating a second die comprises forming a bottom wall of the second die having a thickness less than all other portions of the first and second dies.

8. The method of fabricating an ultrasonic coupler according to claim 1, wherein:
    said step of fabricating a first die includes forming a convex surface in the first die between positions of attachment with the connecting member;
    said step of fabricating a second die includes forming a pouring inlet in the second die; and
    said method of fabricating an ultrasonic coupler further comprising the steps of
        attaching the connecting member to the first die at the corresponding positions of attachment,
        placing the second die over the first die, and
        pouring of the aqueous solution into the die;
    wherein during the freezing and defrosting of the poured aqueous solution, the connecting member connects to the ultrasonic coupler formed from the aqueous solution.

9. The method of fabricating an ultrasonic coupler according to claim 1, wherein:
    said step of fabricating a first die includes forming the first die in a T-shape and forming a pouring inlet in the first die; and
    said method of fabricating an ultrasonic coupler further comprising the steps of
        attaching the connecting member to the first die,
        placing the first die over the second die, and
        ceasing the pouring of the aqueous solution into the die when the aqueous solution reaches the lowest extending portion of the first die after the first die is placed over the second die;
    wherein during the freezing and defrosting of the poured aqueous solution, the connecting member connects to the ultrasonic coupler formed from the aqueous solution.

10. A method of fabricating an ultrasonic coupler, comprising the steps of:
    preparing a die, wherein at least part of the die is provided with a flexible body with expanding and contracting properties, said step of preparing a die including
        forming a first die for forming a junction plane of the ultrasonic coupler and an ultrasonic probe to be contacted by the ultrasonic coupler as a part of a configuration of the ultrasonic coupler, the first die being adapted to detachably mount a connection member for connecting the ultrasonic coupler with the ultrasonic probe, and thereby allowing a simultaneous connection of the ultrasonic coupler to the connection member during formation of the ultrasonic coupler, and
        forming a second die, used in conjunction with the first die, for forming the configuration of the ultrasonic coupler except for the junction plane;
    pouring an aqueous solution containing a polymer into the prepared die; and
    freezing and defrosting the poured aqueous solution to form the ultrasonic coupler having the connection member connected thereto.

11. The method of fabricating an ultrasonic coupler according to claim 10, further comprising:
    facing the first die downwards, such that the first die is a top die, and forming an inlet in the first die for pouring the aqueous solution into the die; and said step of forming a second die further comprising;

forming a bottom wall comprising a flexible body having a thickness of no greater than 2 mm for the second die, the second die being a bottom die.

12. The method of fabricating an ultrasonic coupler according to claim 10, wherein said step of fabricating a second die comprises forming a bottom wall of the second die having a degree of flexibility greater than all other portions of the first and second dies.

13. The method of fabricating an ultrasonic coupler according to claim 10, wherein said step of fabricating a second die comprises forming a bottom wall of the second die having a thickness less than all other portions of the first and second dies.

14. The method of fabricating an ultrasonic coupler according to claim 10, wherein:

said step of fabricating a first die includes forming a convex surface in the first die between positions of attachment with the connecting member;

said step of fabricating a second die includes forming a pouring inlet in the second die; and said method of fabricating an ultrasonic coupler further comprising the steps of attaching the connecting member to the first die at the corresponding positions of attachment, placing the second die over the first die, and pouring of the aqueous solution into the die;

wherein during the freezing and defrosting of the poured aqueous solution, the connecting member connects to the ultrasonic coupler formed from the aqueous solution.

15. The method of fabricating an ultrasonic coupler according to claim 10, wherein:

said step of fabricating a first die includes forming the first die in a T-shape and forming a pouring inlet in the first die; and said method of fabricating an ultrasonic coupler further comprising the steps of attaching the connecting member to the first die, placing the first die over the second die, and ceasing the pouring of the aqueous solution into the die when the aqueous solution reaches the lowest extending portion of the first die after the first die is placed over the second die;

wherein during the freezing and defrosting of the poured aqueous solution, the connecting member connects to the ultrasonic coupler formed from the aqueous solution.

16. The method of fabricating an ultrasonic coupler according to claim 10, wherein only the first die, and not the second die, is flexible.

* * * * *

UNITED STATES PATENT AND TRADEMARK OFFICE
CERTIFICATE OF CORRECTION

PATENT NO.   : 5,882,557
DATED        : March 16, 1999
INVENTOR(S)  : Hayakawa et al.

It is certified that error appears in the above-identified patent and that said Letters Patent is hereby corrected as shown below:

Col. 2,   line 11, "progresses" should be --progresses,--;
          line 12, delete ",";
          line 41, "above described" should be
               --above-described--.

Col. 3,   lines 8, 20, 22 and 65, after "T-shaped"
               insert -- ⊥ --.

Col. 4,   line 1, before "like" insert -- ⊥ --.

Col. 5,   line 26, delete "the" (third occurrence).

Col. 7,   lines 10, 12, 52, after "T-shaped"
               insert -- ⊥ --.

Col. 8,   lines 2, 5, 7, 42, after "T-shaped"
               insert -- ⊥ --.

Signed and Sealed this

Seventh Day of September, 1999

Q. TODD DICKINSON

*Attest:*

*Attesting Officer*   *Acting Commissioner of Patents and Trademarks*